United States Patent [19]
Funk et al.

[11] Patent Number: 5,599,367
[45] Date of Patent: Feb. 4, 1997

[54] PROCESS FOR OPERATING A GLASS-BENDING PRESS

[75] Inventors: Dieter Funk, Witten; Dieter Bruns, Rheinberg; Rolf Wenning, Bocholt; Walter Brans, Recklinghausen, all of Germany

[73] Assignee: Flachglas Aktiengesellschaft, Furth, Germany

[21] Appl. No.: 422,501

[22] Filed: Apr. 12, 1995

[30] Foreign Application Priority Data

Apr. 15, 1994 [DE] Germany .................. 44 12 746.4

[51] Int. Cl.⁶ .................................................. G05B 15/02
[52] U.S. Cl. .................. 65/29.11; 65/29.1; 65/29.12; 65/106
[58] Field of Search .................. 65/29.1, 29.11, 65/29.12, 160, 163, 106, 107, 287, 289, 290, 291

[56] References Cited

U.S. PATENT DOCUMENTS

| | | | |
|---|---|---|---|
| 4,185,983 | 1/1980 | Febbo | 65/104 |
| 4,704,152 | 11/1987 | Davey | 65/29 |
| 4,767,434 | 8/1988 | Schwartz et al. | 65/29 |
| 4,782,449 | 11/1988 | Brinker et al. | 364/473 |
| 5,236,485 | 8/1993 | Leweringhaus et al. | 65/29 |

FOREIGN PATENT DOCUMENTS

| | | |
|---|---|---|
| 1-172238 | 10/1989 | Japan . |
| 90/11973 | 10/1990 | WIPO . |

Primary Examiner—Donald E. Czaja
Assistant Examiner—Sean Vincent
Attorney, Agent, or Firm—Herbert Dubno

[57] ABSTRACT

Process for operation of a press-bending station for bending glass sheets during the course of automated production of motor vehicle windows, during which manufacture the glass sheets to be bent are fed into a cyclically operating press-bending station, and after the bending operation are fed out of the press-bending station with the aid of a means of conveyance in the form of a shuttle ring into a cooling and/or toughening station. The press-bending station incorporates in its press an upper male press mold with vacuum-locating device for the bent glass sheet, a lower female press mold and the shuttle ring. The press incorporates a press upper beam which is movable up and down, to which a male press mold is attached. The bent glass sheet retained under the male press mold with the aid of the vacuum-locating device is fed to the shuttle ring by a downward movement. The downward motion is controlled or regulated according to a velocity curve which incorporates for commencement of downward motion an acceleration section, a maximum velocity curve section and a subsequent deceleration section for soft deposition of the bent glass sheet on the shuttle ring. The velocity curve is such that the first derivative of the velocity curve is free from singularities with respect to time. The reduced pressure of the vacuum-locating device is matched to the mass of the bent sheet. Deceleration of the downward motion of the press upper beam is matched to the reduced pressure of the vacuum-locating device.

7 Claims, 3 Drawing Sheets

PROCESS FOR OPERATING A GLASS-BENDING PRESS

FIELD OF THE INVENTION

Our present invention relates to a process for operation of a press-bending station for bending glass sheets in the automated production of motor vehicle windows, during which production the glass sheets to be bent are heated in a continuous furnace to a specified bending temperature and directly after leaving the continuous furnace are fed consecutively with the aid of a horizontal conveyor in a horizontal position into a cyclically operating press-bending station, and after the bending operation are fed out of the press-bending station with the aid of a means of conveyance in the form of a shuttle ring into a cooling and/or toughening station.

More particularly, the invention relates to a glass-bending press which incorporates an upper male press mold with a vacuum locating device for the bent glass sheet, a lower female press mold and a shuttle ring on which the bent glass sheet can be deposited and with which it can be fed into the cooling and/or toughening station, the press further having an upper press beam carrying the upper male press mold which is movable up and down and can be operated by means of a press cylinder/piston arrangement mounted on the press frame.

BACKGROUND OF THE INVENTION

A press-bending station of the configuration described can be used in the automated production of motor vehicle windows in a plant which operates cyclically (WO 90/11973).

Problems can occur however when the glass sheets are particularly heavy and/or particularly susceptible to fracture or if production requires high output of the plant as a whole and thus short cycle times. In such cases, during deposition of the individually bent glass sheets on the shuttle ring, the glass sheets can suffer damage or during initiation of deceleration which is carried out for the purpose of deposition, the glass sheets can be released prematurely from beneath the male press mold with its vacuum-locating device, as a result of the force resulting from the negative acceleration which can be greater than the retaining force of the vacuum-locating device.

Reduction of the pressure with which the vacuum-locating device operates, for the purpose of increasing the suction force, is not feasible because the glass sheet which is still relatively soft reproduces the suction points of the vacuum-locating device on its surface.

OBJECTS OF THE INVENTION

It is an object of the invention to provide an improved process for operating a bending press in a plant of the type described which will ensure that the bent glass sheets can always be deposited positively on the shuttle ring, that is to say even with the short cycle times and low pressure of the vacuum-locating device.

Another object is to provide an improved method of operating a glass-bending press so that more reliable positioning of the glass sheets will result.

SUMMARY OF THE INVENTION

These objects are attained in accordance with the invention in a process for operation of a press-bending station for bending glass sheets during the course of automated production of motor vehicle windows wherein the glass sheets to be bent are heated in a continuous furnace to a specified bending temperature and directly after leaving the continuous furnace are fed consecutively in a horizontal position with the aid of a horizontal conveyor into a cyclically operating press-bending station with the aid of a means of conveyance in the form of a shuttle ring into a cooling and/or toughening station.

The press-bending station incorporates in its press an upper male press mold with a vacuum-locating device for the bent glass sheet, a lower female press mold and the shuttle ring on which the bent glass sheet can be deposited and with which it can be fed into the cooling and/or toughening station.

The press incorporates a press upper beam with the male press mold attached thereto and which is movable up and down and which can be operated by means of a press cylinder/piston arrangement mounted in the press frame.

According to the invention:

(a) the bent glass sheet retained under the male press mold with the aid of the vacuum locating device is fed by a downward movement of the press upper beam to the shuttle ring which is maintained at a constant level above the female press mold, (b) the downward motion is controlled or regulated according to a velocity curve which incorporates for commencement of downward motion an acceleration section, a maximum velocity curve section and a subsequent deceleration section for soft deposition of the bent glass sheet on the shuttle ring, and (c) the velocity curve is such that the first derivative of the velocity curve is free from singularities with respect to time.

The reduced pressure of the vacuum-locating device is matched to the mass of the bent sheet and deceleration of the downward motion of the press upper beam is matched to the reduced pressure of the vacuum-locating device such that the retaining force of the vacuum-locating device is always greater than the opposing force resulting from deceleration and the bent glass sheet is not released from the male press mold during deceleration.

Subsequently, as a result of reducing or shutting off of the reduced pressure of the vacuum-locating device, the bent glass sheet is deposited on the shuttle ring.

Adaptation of the reduced pressure and the matching described can be carried out with the configuration of the corresponding plant which is operated in accordance with the process according to the invention. This is advisable, particularly when a plant is involved which is designed for a large number of identical glass sheets and consequently only has to be changed over from time to time to different operating conditions. Corresponding conversion and matching devices can readily be implemented in the case of such plants with the aid of modern control engineering and drive technology. Adaptation and matching can be carried out manually.

If a plant is involved which must be adapted frequently to different operating conditions, for example because batchwise there must be a greater or lesser number of identical glass sheets in batches, whose glass sheets differ from batch to batch, the invention provides a computer with which the reduced pressure of the vacuum-locating device is matched to the mass of the individual bent glass sheets and deceleration of the downward motion of the press upper beam to suit the reduced pressure of the vacuum-locating device is carried out.

The velocity curve can be chosen to a large extent optionally according to features (b) and (c) if only the adaptation and matching described are carried out. In the feature where the first derivative of the velocity curve is free from singularities with respect to time, the velocity curve evidences no points of discontinuity, such as kinks and the like. In fact, such points of discontinuity in the velocity curve would, if present, produce singularities in the first derivative of the velocity curve and thus in the process of acceleration, which could lead to releasing the bent glass sheet from the male press mold in spite of the vacuum-locating device operating with the specified reduced pressure.

This is prevented by the invention so that the matching and adaptation described are not interfered with and satisfactory deposition of the bent sheets on the shuttle ring can take place. Satisfactory results can be obtained, even with very short cycle times and/or slight reduced pressure during operation of the vacuum-locating device, if the velocity curve represents a section of a time-function sine curve over the time $\pi$, where the time $\pi$ corresponds to the length h in the downward motion and the complete sine curve is provided in the time $2\pi$.

In the case of strictly sinusoidal motion, the acceleration section and deceleration section of the velocity curve are equally steep at all times. Alteration of the deceleration section here will always mean a corresponding alteration of the acceleration section. Reduction of deceleration and of deceleration time in the deceleration section will always mean reduction of the acceleration stage as well. According to a preferred embodiment of the invention, the acceleration section of the velocity curve is steeper than the deceleration section, that is to say therefore, that the velocity curve is not strictly sinusoidal. Here, deceleration and deceleration time can be reduced without altering acceleration and in the acceleration section and the cycle time can be reduced by acceleration being increased in the acceleration section without carrying out changes in the deceleration section.

For downward motion of the press beam, modern control and drive engineering provides a multitude of resources which can be utilized within the scope of the invention. Simplicity and reliability distinguish a method where the downward motion of the press beam is effected with the aid of the press cylinder/piston arrangement operated with a hydraulic medium and a servomotor for the hydraulic system which is controlled by the computer. The computer can operate according to program, as a function of time and/or as a function of displacement. The computer can also be provided sensors which track the operation of the press-bending station.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
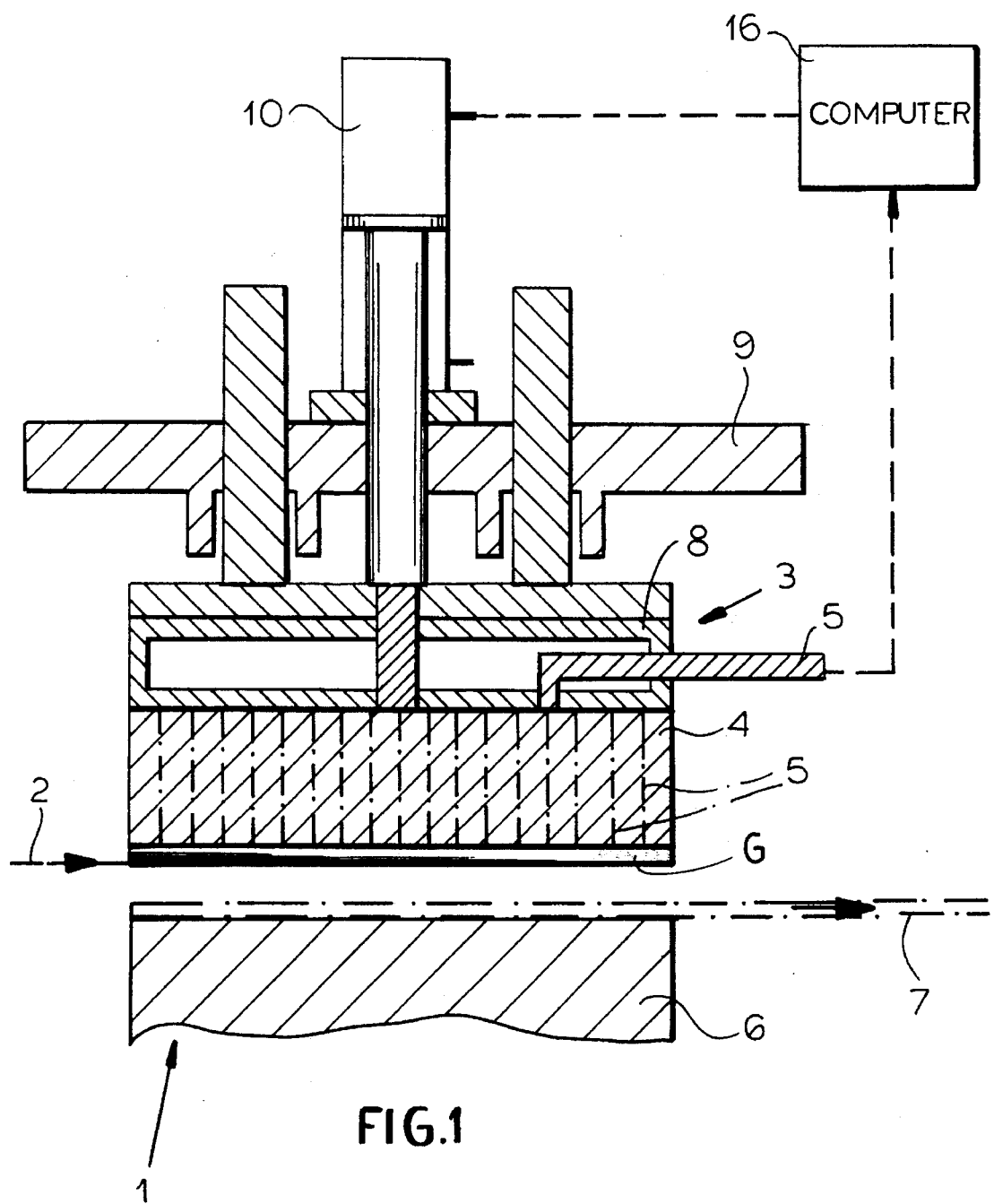
FIG. 1 is a highly diagrammatic cross section through a press for bending glass sheets during the course of automated production of motor vehicle windows.

When bending glass sheets during the course of automated production of motor vehicle windows, the glass sheets to be bent are heated in a continuous furnace preceding the press-bending station 1 illustrated to a specified temperature. Directly after leaving the continuous furnace, they are fed consecutively in a horizontal position with the aid of a horizontal conveyor 2 into the cyclically operating press-bending station 1. After the bending operation, the glass sheets G are removed from the press-bending station 1 with the aid of a means of conveyance and fed into a cooling and/or toughening station which follows the press-bending station 1 but which is not itself illustrated.

The press-bending station 1 incorporates in its press 3 an upper male press mold 4 and vacuum-locating device 5 for the bent glass sheet, a lower female press mold 6 and a shuttle ring which represents the means of conveyance for conveying the individual bent glass sheets G out of the press-bending station 1 into the cooling and/or toughening station. On the shuttle ring 7, the bent glass sheets G can be deposited individually, and fed with it onto the cooling and toughening station. The press 3 possesses a press upper beam 8 which can be moved up and down with attached male press mold 4. The press upper beam 8 can be operated by means of a press cylinder/piston arrangement 10 mounted in the press frame 9.

From FIG. 1, it can be seen that the bent glass sheet retained under the male press mold 4 with the aid of the vacuum-locating device 5 is fed by means of downward motion of the press upper beam to the shuttle ring 7 which is maintained at a constant level above the female press mold 6.

Figure 2:
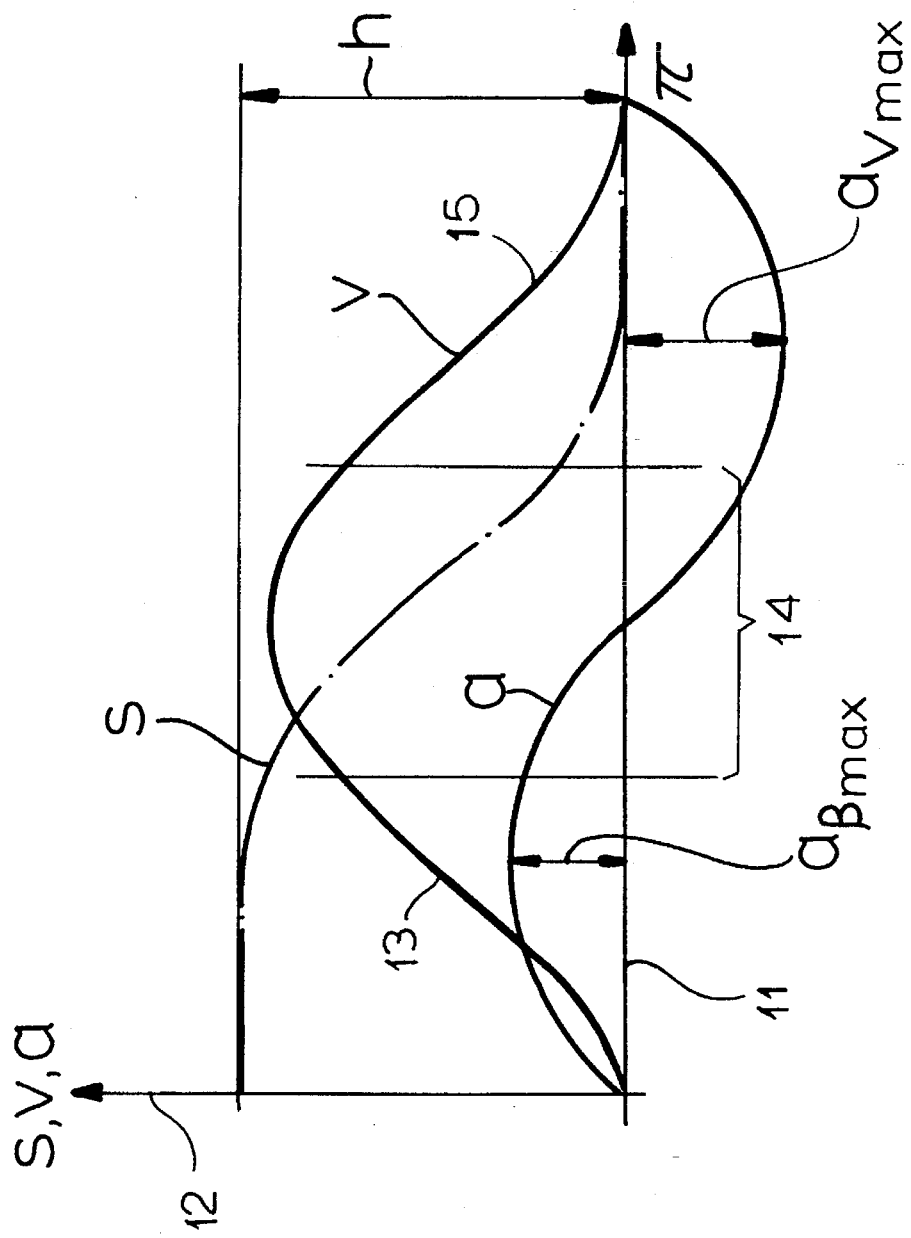
FIG. 2 is a graph of displacement/time and velocity/time relationships and acceleration/time relationships with sinusoidal motion.
Figure 3:
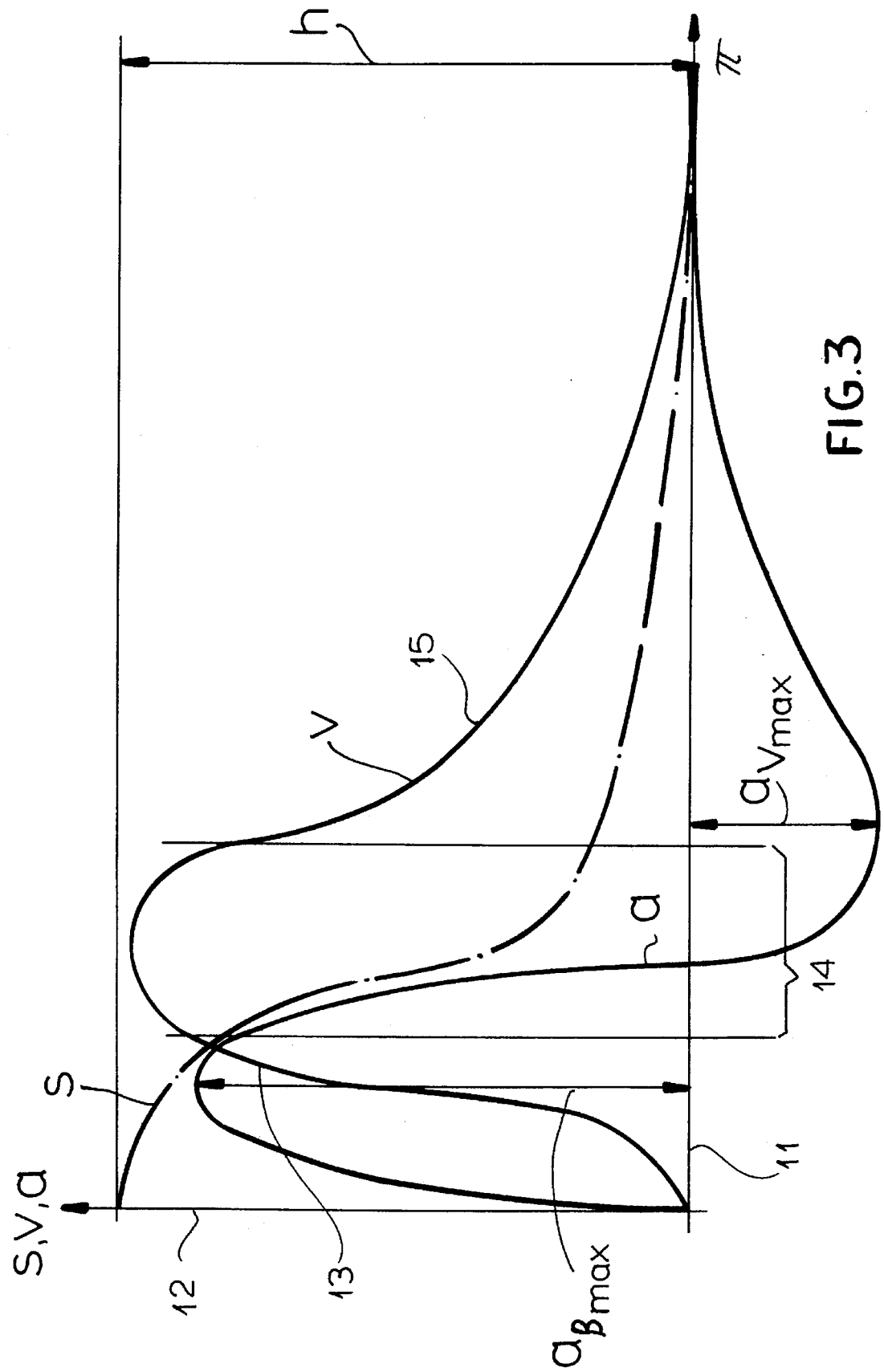
FIG. 3 is a graph of displacement/time and velocity/time relationships and acceleration/time relationships with non-sinusoidal motion.

FIGS. 2 and 3 illustrate the further kinematics of the interrelationships. These are graphical representations which explain the displacement and velocity of the downward motion. Along the abscissa axis 11 has been plotted the time, along the ordinate axis 12 have been plotted the displacement s, the velocity v and the acceleration a. The velocity curve has in each case been designated v, the acceleration curve has been shown at a and the displacement has been shown at curve s.

If one considers first of all the velocity curve V, it can be seen that it incorporates for the commencement of downward motion an acceleration section 13, a cycle-time-determining curved section 14 and an adjacent deceleration section 15 for soft deposition of the bent glass sheet G on the shuttle ring 7. Analysis of the velocity curve v shows that its first derivative (i.e. the acceleration curve a) is free from singularities with respect to time in each case. The velocity curve v itself is the first derivative of the displacement curve s.

If the opening motion commences at time zero, initially only a small distance is covered which proceeds so to speak more steeply according to the displacement curve s and then becomes smaller. Corresponding thereto is consequently the velocity curve v described which shows that at the commencement of downward motion, the velocity is initially low, then increases to a higher value up to a maximum value and drops again. Soft deposition of the bent glass sheets G on the shuttle ring 7 is consequently possible.

The reduced pressure of the vacuum locating device 5 is matched to the mass of the bent glass sheet G. Deceleration of downward motion of the press upper beam 8 is matched to the reduced pressure of the vacuum-locating device 5 such that the retaining force of the vacuum-locating device 5 is always greater than the opposing force of the bent glass sheet G resulting from deceleration which is proportionate to the mass of the bent glass sheet G. Consequently, the bent glass sheet G is not released from the male press mold 4 on deceleration, that is to say not even with relatively low vacuum, so that afterwards by shutting off or reducing the pressure of the vacuum-locating device 5, the bent glass sheet G can be deposited softly on the shuttle ring 7.

In the example and according to a preferred embodiment of the invention, provision is made for a computer 16, as indicated in FIG. 1. With the computer 16, the reduced pressure of the vacuum-locating device 5 is matched to the mass of the bent glass sheet G and the matching already described is carried out. In the example, the downward motion of the press upper beam 8 is effected with the aid of the press cylinder/piston arrangement 10 operated with a hydraulic medium and a servomotor for the hydraulic system, which is not shown, which is controlled by the computer 16. The computer 16 itself operates according to program as a function of time and/or as a function of displacement; in the case of control as a function of displacement it cooperates with corresponding sensors.

As FIG. 2 shows, the velocity curve v represents, according to a preferred embodiment of the invention, a section of a time-function sine curve over the time $\pi$, where the time $\pi$ corresponds to the time which is necessary for movement of the press upper beam 8 according to the distance for downward motion. At the end of this time $\pi$ and thus at the end of a displacement which corresponds to the length h of the downward motion, the bent glass sheet G lies on the shuttle ring 7 and has been softly deposited there.

The complete time-function sine curve in FIG. 2 corresponds to the time 2 $\pi$. As FIG. 2 shows, the sinusoidal motion, acceleration section 13 and deceleration section 15 of the velocity curve v are equally steep. Here, reduction of the maximum deceleration $a_{Vmax}$ always means as well corresponding reduction of the maximum acceleration $a_{Bmax}$ of the acceleration phase. According to a further preferred embodiment of the invention which is illustrated in FIG. 3, the acceleration section 13 of the velocity curve v is steeper than the deceleration section 15. With this embodiment of the invention, shortening of the cycle time is possible by increasing the maximum acceleration $a_{Bmax}$ of the acceleration section, without at the same time correspondingly altering $a_{Vmax}$.

Of course, after depositing a bent glass sheet G on the shuttle ring 7, the shuttle ring 7 is withdrawn from the press-bending station 1 while at the same time a further glass sheet to be bent is inserted in the press-bending station 1.

We claim:

1. A method of operating a glass-bending press comprising a male press mold movable up and down in a press frame and located above a female press mold, said method comprising the steps of:

(a) feeding a glass sheet to be bent from a continuous furnace horizontally between said male and female molds into said press and pressing said glass sheet into a bent glass sheet between said molds;

(b) raising said male press mold and retaining said bent glass sheet thereon as said male press mold is raised by applying suction to said bent glass sheet with a vacuum-locating device;

(c) positioning a shuttle ring at a constant level above said female press mold and moving said male press mold with the bent glass sheet held by suction thereon downwardly in a downward motion to place said bent glass sheet on said shuttle ring;

(d) displacing said shuttle ring with the bent glass sheet thereon out of said press and into a cooling and toughening station;

(e) controlling downward movement in step (c) of said male press mold and the bent glass sheet held by suction thereon so that said downward movement is effected with a velocity curve having an initial acceleration section, a maximum velocity section and a final deceleration section for soft deposition of said bent glass sheet on said shuttle ring, and the velocity curve has a first derivative with respect to time free from singularities; and (f) matching a suction force of the suction holding said bent glass sheet on said male press mold to a mass of the bent glass sheet and deceleration of said male press mold so that a retaining force of said suction is always greater than an opposing force of deceleration and said bent glass sheet is not released from said male press mold during deceleration until, as a result of a decrease in said suction force, said bent glass sheet is deposited on said shuttle ring.

2. The method defined in claim 1 wherein in step (f) matching is effected with a computer with which the reduced pressure of the vacuum-locating device is matched to the mass of the bent glass sheet and deceleration of the downward motion of the press upper beam to the reduced pressure of the vacuum-locating device.

3. The method defined in claim 1 wherein the velocity curve represents a section of a time-function sine curve over the time $\pi$, where the time $\pi$ corresponds to the length h of the downward motion and the complete sine curve corresponds to the time 2 $\pi$.

4. The method defined in claim 1 wherein the initial acceleration section of the velocity curve is steeper than the final deceleration section.

5. The method defined in claim 2 wherein the downward motion of the male press mold is effected a press cylinder/piston arrangement operated with a hydraulic medium and with a hydraulic system servomotor which is controlled by the computer.

6. The method defined in claim 2 wherein the computer operates according to a program and is controlled as a function of time.

7. The method defined in claim 2 wherein the computer operates according to a program and is controlled as a function of displacement of the male mold.

* * * * *